April 7, 1953        J. C. MONAHAN        2,634,145
SEAL GUARD
Filed June 14, 1949
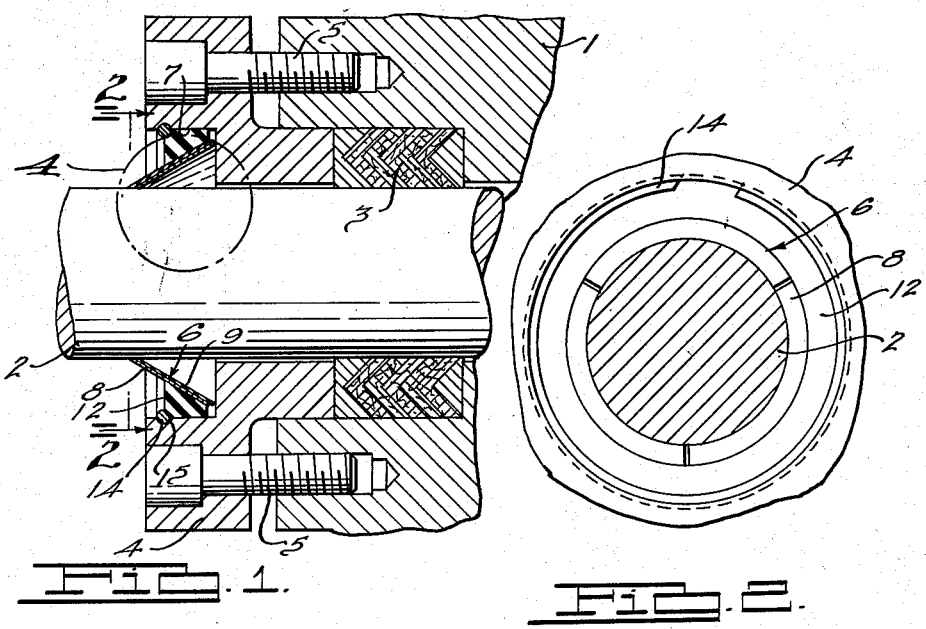
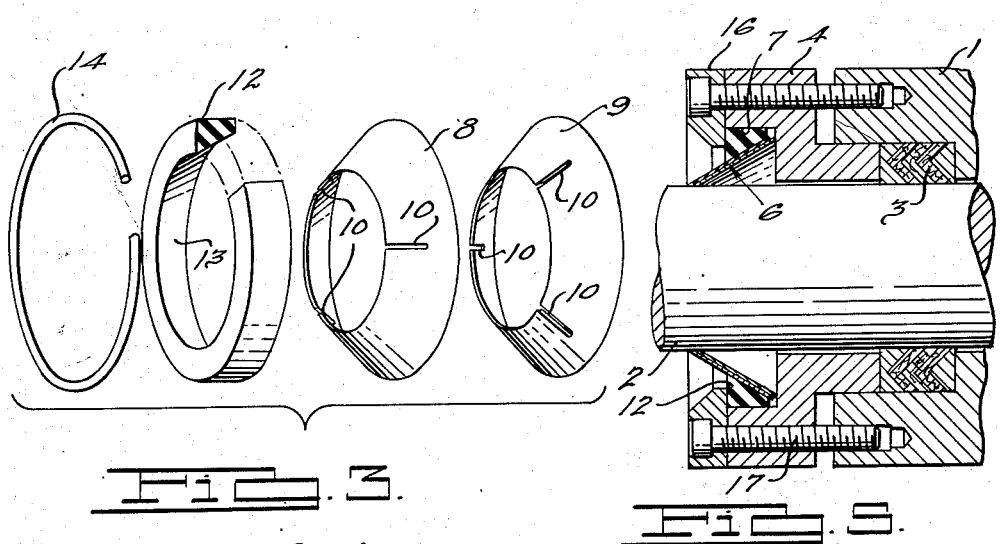
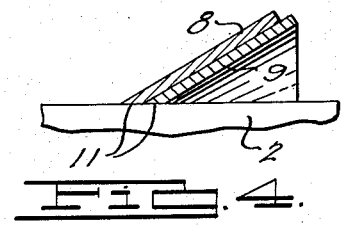
INVENTOR.
John C. Monahan.
BY
Harness, Dickey & Pierce
ATTORNEYS.

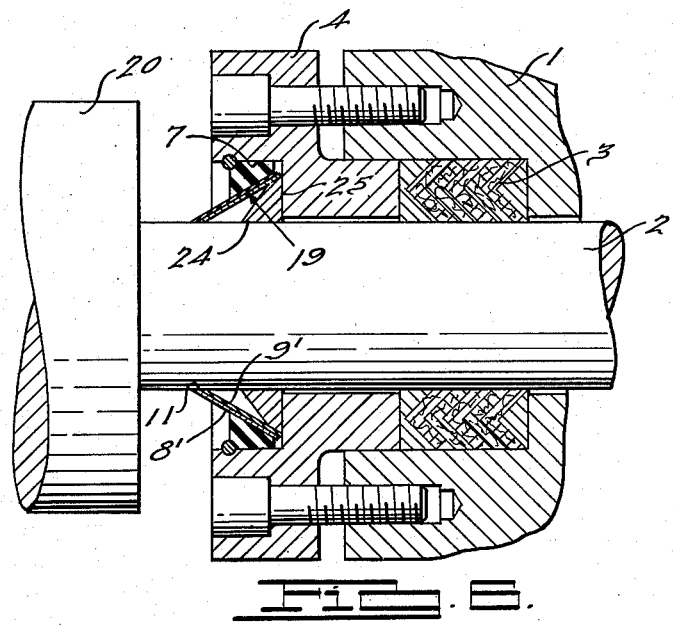
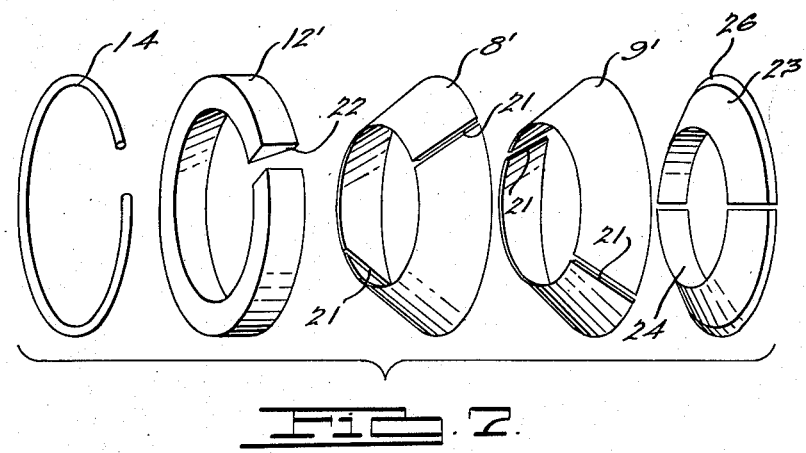
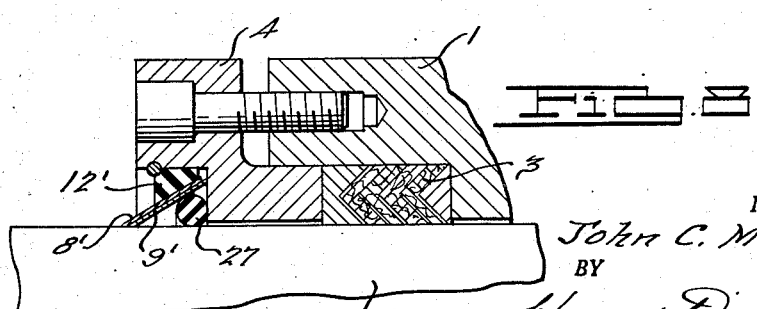

Patented Apr. 7, 1953

2,634,145

UNITED STATES PATENT OFFICE 2,634,145

SEAL GUARD

John C. Monahan, Detroit, Mich.

Application June 14, 1949, Serial No. 98,987

2 Claims. (Cl. 288—2)

The present invention relates to improvements in guards for protecting seal packings.

Seal packings are conventionally employed with mechanisms such as hydraulic piston and cylinder constructions to prevent leakage around the rod through the end of the cylinder. In prior constructions, due to the relative movement of the rod in its reciprocation through the end of the cylinder, foreign material such as sand, grit, rust scale, steel chips, paint and the like are carried into the conventional seal packing resulting in scoring of the rod and wearing out the packing. This results in costly repairs, both to the unit itself and loss due to necessary shutdown of the equipment of which the piston and cylinder assembly forms a part. According to the present invention, and to prevent the accumulation of abrasive foreign particles from working their way into the packing gland, a guard is employed in which a resilient metal element engages the peripheral surface of the reciprocating piston rod so that the engaging surface of the guard lifts or removes foreign particles completely off the rod, and prevents them from gaining entrance into the packing gland.

One of the primary objects of the present invention is to provide an improved guard of the type mentioned, which removes foreign material from the rod, and thus prevents the foreign material from entering the packing gland, to thereby increase the effective life of the packing and thus effect considerable operating savings.

A further object of the invention is to provide a self-adjusting, easy-to-install guard, which will not score the rod, but which is mounted within a floating cushion so that side thrust is absorbed.

A further object of the invention is to provide improved guards which will retain a concentric shape in their contact with the rods during relative movement therebetween.

A further object of the invention is to provide improved guards of the type mentioned which may readily be installed around a rod, where access may not be had over the end of the rod.

Other objects of the invention will become apparent from the following specification, from the drawings relating thereto, and from the claims hereinafter set forth.

In the drawings, in which like numerals are used to designate like parts in the several views throughout:

Figure 1 is a cross-sectional view of a portion of a piston and cylinder assembly, showing the seal guard of the present invention applied thereto;

Fig. 2 is an end elevational view, taken substantially along the line 2—2 of Fig. 1;

Fig. 3 is a separated, perspective view, with parts in cross-section, of the elements making up the seal guard of Fig. 1;

Fig. 4 is an enlarged cross-sectional view, taken within the circle 4 of Fig. 1;

Fig. 5 is a view similar to Fig. 1, but showing a modified form of seal guard;

Fig. 6 is a view similar to Fig. 1, but showing a modified form of piston construction, and a modified form of seal guard according to the present invention;

Fig. 7 is a separated perspective view of the elements making up the seal guard of Fig. 6; and Fig. 8 is a partial cross-sectional view, similar to Fig. 6, and showing a modified form of seal guard.

In Figs. 1–5, a seal guard construction is shown which may be applied over the end of the piston rod. In Figs. 6–8, a seal guard is shown which cannot be applied over the end of the rod, but which is formed in segments or separable parts so that it may be applied around the rod.

Referring to Figs. 1–4, a nose of an hydraulic cylinder is shown at 1 with a reciprocating piston rod 2 projecting through the end thereof. Packing 3 is disposed within the nose of the cylinder 1 in the usual way, embracing the rod 2, and is held in place by a gland 4 which is bolted to the nose of the cylinder 1 by means of bolts 5.

A seal guard of the present invention is generally indicated at 6, and is adapted to be received within an annular recess 7 formed in the gland 4. The seal guard 6 embraces the rod 2 and in this embodiment may be positioned over the end of the rod to the position shown within the gland.

The seal guard 6 comprises a pair of frustoconical members 8 and 9 which are identical to each other. The members 8 and 9 are formed of brass, bronze, or other bearing material softer than the material of the rod 2. They are provided with longitudinally extending slots 10 through the smaller ends or radially inner edges thereof at spaced points therearound, and the smaller ends terminate in knife edges indicated at 11. The members 8 and 9 are thus resilient, and the knife edges at the inner ends resiliently engage the outer surface of the rod 2. The members 8 and 9 may be slipped over the projecting end of the rod 2 and interfit each other, as shown in Fig. 1, preferably with the slots 10 offset with respect to each other.

An annular backing member 12, preferably of soft, synthetic rubber, embraces the outer scraper ring 8. The radially inner surface 13 of the backing member 12 is complementary in shape to the surface of the ring 8, and the outer annular surface of the ring 12 is substantially cylindrical in form so that it fits within the recess 7 of the nose 4. The ring 12 is of such dimensions and width that it engages the ring 8, when assembled, over a portion only of the surface of the ring 8 and adjacent the larger or axially inner end of the ring 8. Thus, the axially outer or smaller end of the ring 8 is flexible with respect to the rod 2. The soft rubber backing 12 provides, in effect, a floating support for the scraper rings 8 and 9, so that the engaging opening in the rings 8 and 9 will remain concentric even though there may be slight deflection in the rod 2. In other words, even though the rod 2 might deflect from its true axis as it reciprocates, the opening in the scraper rings will not be worn egg-shaped but the scraper rings may float with the rod. Also it will be noted that the ring 8 at its larger or radially outer end extends beyond said backing 12 thereby preventing any chewing of the backing 12 by this radially outer end or edge of the ring 8.

The seal guard assembly, including the rings 8 and 9 and the backing member 12, may be held in place in the nose by means of a snap ring 14 which is snapped into an annular recess 15 formed in the nose.

As the rod 2 reciprocates, the knife edges 11 of the scraper rings 8 and 9 engage the surface of the rod and scrape off any foreign materials on the rod such as sand, grit, rust scale, steel chips, paint and the like, and thus prevent this accumulation of abrasive foreign particles from working their way into the packing gland 3.

While in the embodiment described above a pair of rings 8 and 9 are used, it is to be understood that in some installations a single ring may be sufficient, while in other installations more rings may be required.

Referring to Fig. 5, the packing gland 6 is the same as that shown in Figs. 1–4 but a modified form of securing the sealing assembly 6 in the nose is illustrated. In this embodiment, the backing member 12 terminates at the outer end substantially flush with the surface of the nose 4. An annular ring 16 projects inwardly of the groove 7 and overlaps the outer surface of the backing member 12. The ring 16 is secured to the nose 4 by bolt 17, and the sealing guard assembly 6 is thus held against axial displacement.

In the embodiments shown in Figs. 1 and 5, the inner end of the ring 9 abuts the adjacent surface of the nose so that axial displacement in the other direction is prevented.

Referring to Figs. 6 and 7, a modified sealing ring is generally indicated at 19. In this embodiment, the rod 2 has a permanent enlargement 20 formed on the projecting end, so that access to the groove 7 for application of the seal guard may not be had over the projecting end of the rod 2. It is necessary to apply the seal guard around the rod. The function and construction of the sealing guard elements are substantially the same as in the embodiment previously described, except that the elements are formed in segments, or are split, so that they may be applied around the rod.

The seal guard 19 comprises a pair of frusto-conical scraping rings 8' and 9' which are of the same material as the rings 8 and 9, and which terminate in knife edges 11. The rings 8' and 9' are split into segments by longitudinally extending slots 21 at diametrically opposed points. The annular backing member 12' is the same as the backing member 12, except that a segment is removed, as indicated at 22, so that the ring may be opened and disposed around the shaft 2.

In order to hold the segments of the rings 8' and 9' in place until the resilient backing 12' is applied, an inner annular support 23 is provided. The support 23 is formed in two segments so that it may be applied around the shaft 2, and is usually formed of bronze but may be formed of leather or a hard, synthetic rubber. The supporting ring 23 has a central opening 24 which embraces the shaft 2, and has an inner surface 25 which is adapted to abut against the adajcent surface of the groove 7 in the nose 4. The outer surface of the ring 23 tapers upwardly and terminates in a taper 26 which is complementary to the taper on the scraper rings. Thus, in assembly, the ring 23 is first positioned as shown in Fig. 6 and the interfitting scraper rings 8' and 9' are then applied so that the inner ends of the scraper rings are supported by the ring 23. The resilient backing ring 12' is then applied in the same relationship as in the embodiment above described so that the scraper elements are held in proper assembled relationship.

The entire scraper assembly may then be held in place by a snap ring 14, as in the embodiment shown in Fig. 1.

Referring to Fig. 8, a modified embodiment is illustrated in which, instead of using the supporting ring 23 as shown in Fig. 6, the backing member comprises a rubber O-ring 27. The O-ring 27 is split similar to the ring 12', so that it may be applied around the shaft 2 and positioned, as shown in Fig. 8. The O-ring engages the inner surface of the scraper ring 9 and thus supports the scraper rings 8 and 9 until the assembly is completed by the application of the backing ring 12'.

The function and use of the embodiment shown in Figs. 6–8 is the same as in the embodiment previously described.

In another modification it is pointed out that an unsplit O-ring may be used with the structure of Fig. 1. This O-ring would engage the rod or shaft and would provide a fluid-tight hydraulic seal, sufficient in itself for some installations.

It is also pointed out that the structure of the present invention would find uses other than in protecting packing. For example, it is contemplated that the invention may be employed to scrape foreign materials from retracting dowel pins and on machine parts to keep foreign materials on spindles from reaching internal bearings.

Formal changes may be made in the specific embodiment shown without departing from the spirit and substance of the subjoined claims.

What is claimed is:

1. A guard comprising a frusto-conical member of metallic material and a resilient non-metallic yieldable backing member engaging a portion only of the outer surface of said frusto-conical member, said backing member having an inner surface complementary in shape to the external surface of said frusto-conical member and having an outer annular surface substantially cylindrical in form, said backing member being disposed wholly within the axial limits of said frusto-conical member and wholly radially outwardly of said external surface thereof, said backing member being spaced from the axial limits of said frusto-conical member.

2. A guard comprising a frusto-conical member of resilient metallic material and a nonmetallic yieldable backing member, the opposite axial faces of said backing member lying in spaced parallel planes at right angles to its axis and having a radially outer annular surface which is substantially cylindrical and a radially inner surface which is frusto-conical and complementary in shape to a portion of the external surface of said frusto-conical member, said frusto-conical member being movable relative to said backing member and extending beyond both said opposite axial faces of said backing member so that the radially outer edge of said frusto-conical member is at all times free of said backing member.

JOHN C. MONAHAN.

REFERENCES CITED

The following references are of record in the file of this patent:

UNITED STATES PATENTS

| Number | Name | Date |
| --- | --- | --- |
| 1,044,787 | Klingloff | Nov. 19, 1912 |
| 2,096,882 | Chernosky | Oct. 26, 1937 |
| 2,226,273 | Westefeldt | Dec. 24, 1940 |
| 2,368,137 | Harmon | Jan. 30, 1945 |
| 2,509,151 | Kasten | May 23, 1950 |